United States Patent Office 3,401,051
Patented Sept. 10, 1968

3,401,051
OXIDIZABLE METALLIFEROUS POWDERS
COATED WITH TERPENE ETHER
Carl Bordenca, Ponte Vedra Beach, Fla., assignor, by
mesne assignments, to SCM Corporation, New York,
N.Y., a corporation of New York
No Drawing. Filed July 8, 1965, Ser. No. 470,616
13 Claims. (Cl. 117—100)

ABSTRACT OF THE DISCLOSURE

Free flowing oxidizable metalliferous powders resistant to oxidation and having a partial to continuous coating of a terpene ether of the formula:

$$T\text{—}O\text{—}(R\text{—}O)_nH$$

where T is a terpene hydrocarbon radical; R is a lower alkylene group, and $n$ is an integer of from 1 to 5, are described. Oxidizable metalliferous particles are rendered resistant to oxidation by the terpene ether.

---

The present invention relates to free-flowing metalliferous powders. The invention more particularly relates to novel free-flowing oxidizable metalliferous powder compositions which are stabilized against oxidation and agglomeration. The invention further relates to processes for stabilizing finely divided oxidizable metalliferous materials against oxidation and agglomeration and to processes for preparing stabilized metalliferous powder compositions.

The term "metalliferous powder" as used herein is intended to mean and to include finely divided particles of certain hereinafter defined elemental metals and certain metal oxides (sometimes herein referred to as metal lower oxides) which are capable of oxidation to a higher valence state.

The term "oxidizable metalliferous powders" as used herein is intended to mean and to refer to finely divided particulate metalliferous materials (e.g., elemental metals and metal oxides) which are susceptible to oxidation in atmospheric air.

Powdered elemental metals and powdered metal oxides are widely used materials and are valuable articles of commerce. Powdered elemental metals are widely used in powder metallurgy; that is, the compression of metal powders at a very high pressure to a desired shape. Elemental metal powders are also used as pigments in decorative metal finishing paints such as bronzing compositions.

Metal oxide powders are used as pigments in paints and in formulations employed in agricultural operations such as, for example, in sprays for killing and preventing the growth of plant fungi and as protective agents to protect plants against damage by insects.

Powdered metals and powdered metal oxides are also often used as catalysts or components of catalysts in the chemical process industry and in some instances as plant fungicides.

When powdered elemental metals or metal alloys such as, for example, powdered copper, iron and steel are used in powder metallurgy operations, the high pressure forming of the powdered metals is usually followed by heating the formed object to a sintering temperature which is usually below the melting point of the metal powder. The fabrication and sintering of these metal shapes (sometimes termed compacts) involves problems such as, for example, the expansion of the "green" (or unsintered) compact after it has been ejected from the forming die, which often results in the fracture of the compact. Also, the unsintered compact often has insufficient green strength, due in part to oxide film formation on the surface of the particles of the metal powder, to permit necessary handling prior to the sintering operation. Further, there is often a weakness in the compact which may cause it to fracture even when in the sintered form if the metal particles used are not free or substantially free of oxide film. The above-described oxide film formation problems which are substantially overcome by the compositions and processes of the present invention are recognized and described in U.S. Patent 2,489,116 issued Nov. 22, 1949 to John L. Young. The tendency of oxide films to form on the surface of metal particles also tends to alter the color of the particles, thus limiting their use as pigments in decorative metal finishing paints such as bronzing compositions.

Metal lower oxide powders, that is, metal oxides which are capable of being oxidized to a higher valence state, also tend to undergo further oxidation when handled under the usual conditions of commerce. When such metal oxides are exposed to ambient environmental conditions in atmospheric air they tend to oxidize or partially oxidize to a higher valence state. Under such circumstances, the powdered metal lower oxide particles tend to cake or agglomerate and to form hard lumps, thus substantially diminishing the dispersibility of the powder in liquids and adversely affecting the free-flowing properties commonly associated with powdered metal oxides. When such metal lower oxide powders, which have coalesced, caked or have formed lumps, are incorporated in formulations such as paints or agricultural sprays, they are extremely difficult to disperse and sometimes remain in the formulation as hard lumps resulting in a lack of homogeneity therein. The problems of further oxidation and caking in metal lower oxides have been recognized in U.S. Patent 2,184,617 issued Dec. 6, 1949 to L. C. Hurd, and U.S. Patent 2,514,868 issued July 11, 1950 to D. S. Hubbell.

A number of attempts, involving the use of oils, gelatin, stearic acid and varnishes have been made heretofore to provide a barrier against contact by the surfaces of the metalliferous powders with oxygen (usually atmospheric oxygen) and to prevent the formation of oxide films on the surface of small particles of oxidizable elemental metals and also to prevent the further oxidation of metal lower oxides. However, these attempts have been considered by many to have been only partially successful since these materials usually either interfere with the end use of the powders or do not efficiently prevent oxidation. The present invention provides novel compositions and processes which unexpectedly overcome the disadvantages and problems encountered in the prior art.

The invention provides a composition comprising oxidizable metalliferous particles, susceptible to oxidation in atmospheric air, having a partial to continuous coating on the surfaces of the particles of a terpene ether of the formula $$T\text{—}O\text{—}(R\text{—}O)_nH \tag{I}$$

where T is a terpene hydrocarbon radical, R is a lower alyylene group and $n$ is an integer of from 1 to 5. These compositions comprise metalliferous powders which are stablized against oxidation, particularly in atmospheric air, by the partial to continuous coating of the terpene ether which is usually a film-forming liquid.

Where the metalliferous powder comprises elemental metal particles having a partial to continuous coating of a terpene ether on the surfaces thereof, such composition is useful in powder metallurgy operations to form unsintered metal compacts which usually have high green strength and good mechanical strength when in the sintered form. Where the metalliferous powder comprises a metal lower oxide, particles having a partial to continuous coating of terpene ether on the surfaces thereof do not undergo appreciable further oxidation, remain substantially free-flowing and are readily dispersible in paint and agricultural spray formulations.

The terpene ethers falling within the scope of the above formula are well known and are generally liquids or semisolids. These ethers and methods for their preparation have been described in U.S. Patents 2,136,011 and 2,151,769 issued Nov. 8, 1938 and Mar. 28, 1939, respectively, to Irvin W. Humphrey; in U.S. Patents 2,220,462 issued Nov. 5, 1940 to Donald H. Sheffield; 2,390,017 issued Jan. 19, 1943 to Jacob M. Shantz; 2,350,147 issued May 30, 1944 to Joseph N. Borglin; 2,440,093 issued Apr. 20, 1948 to William O. Israel. The pertinent terpene ethers described in the aforementioned patents are, as indicated in Formula I, "additive" terpene ethers to distinguish them from ethers produced by reactions involving a hydroxyl group of a terpene alcohol.

In the above formula, T represents a terpene hydrocarbon radical which can be formed by reacting crude natural mixtures of terpene materials such as, for example, trupentine, pine oil, etc. However, T preferably represents an unsaturated terpene hydrocarbon radical formed by the reaction of an unsaturated terpene with an alkylene glycol or alkylene oxide having 1 to 5 carbon atoms in the alkylene group in the presence of a catalyst. Thus, in the above formula T may represent a terpene radical obtained by the reaction of, for example, an unsaturated monocyclic terpene, e.g., dipentene, terpinene, terpinolene, phellandrene, sylvestrene, alpha-terpineol, beta-terpineol, terpineol or other unsaturated mnoncyclic terpene alcohols or mixtures thereof with an alkylene glycol or oxide. T may also represent a terpene radical obtained by the reaction of an unsaturated complex cyclic terpene capable of isomerization to an unsaturated monocyclic terpene such as, for example, alpha pinene, carene, etc.; or a bicyclic terpene which is not readily isomerized such as, for example, camphene and bornylene; with the aforementioned alkylene compound. T may also represents a terpene radical obtained by reacting the dipolymer of pinene, dipentene, etc., with such glycol or oxide. Preferred terpene ethers used in the compositions of this invention are monocyclic unsaturated terpene ethers where T is a monocyclic terpene hydrocarbon radical obtained by the reaction and isomerization of dicyclic alpha pinene with a lower alkylene glycol; for example, ethylene glycol or propylene glycol, or a lower alkylene oxide, such as ethylene glycol or propylene glycol, or a lower alkylene oxide, such as ethylene or propylene oxide.

As noted hereinbefore, R in the above formula is a lower alkylene group and will be determined by the particular alkylene glycol or oxide which is reacted with the terpene compound. Examples of alkylene glycols and oxides which may be reacted with the terpene compound to form R in the above formula include, for example, ethylene glycol, propylene glycol, diglycol, trimethylene glycol, or their corresponding oxides and the like. Thus, when the glycol or oxide reacted is ethylene glycol or ethyleneoxide, R will be an alkylene group containing two carbon atoms (e.g., an ethylene group); when propylene glycol or propylene oxide is reacted, R will be a lower alkylene group containing three carbon atoms (e.g., a propylene group), etc.

In the above formula $n$ is an integer of from 1 to 5, the number being determined by the mol ratio of alkylene oxide which is reacted with an alkylene glycol to form a glycol adduct which is then reacted with a suitable terpene to form the terpene ether. Thus, for example, when 2 mols of ethylene, propylene or butylene oxide are reacted with 1 mol of a corresponding glycol and the resulting product reacted in the presence of a suitable catalyst with 1 mol of terpene, $n$ will be 3.

Terpene ethers which have been found to be particularly advantageous for use in the compositions of the present invention are terpene ethers formed by the reaction of a pinene, preferably alpha pinene, with an alkylene glycol, preferably ethylene glycol or propylene glycol, in the presence of a catalyst such as boron trifluoride etherate, polyphosphoric acid, orthophosphoric acid and ferric chloride hexahydrate, or in certain instances, sodium hydroxide. For example, when 1 mol of pinene is reacted with about 1 mol of ethylene glycol (in a slight molar excess) in the presence of boron trifluoride etherate at a temperature of about 60° C. for about 30 minutes, an isomerization reaction takes place in which there is formed one or more of three isomeric terpene ethers differing only with respect to the position of the ether-alkylene group linkage on the terpene structure. These three isomeric terpene ethers have been postulated, based on nuclear magnetic resonance evidence, to have the following structural formulae:

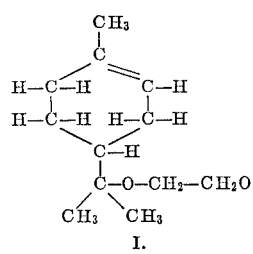
I.

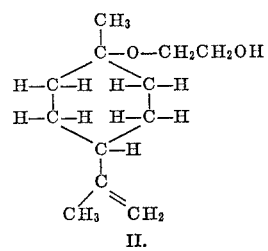
II.

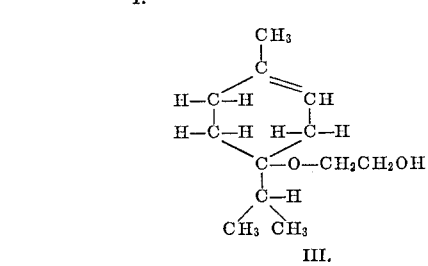
III.

Terpene materials formed by the above-described reaction have been found to be particularly advantageous in the compositions of this invention since they substantially eliminate oxide film formation on the surface of finely divided metalliferous powders when employed as a partial to continuous coating on such surfaces. However, one or more of the hereinbefore described terpene ethers may be employed in the compositions of this invention to provide metalliferous powders which are stabilized against oxidation in atmospheric air.

The amount of terpene ether employed is surprisingly small and will vary with the surface area of the particle surfaces. The quantity of terpene ether is therefore a function of the particle size of the metalliferous particles. As will further be hereinafter evident, the amount of terpene ether employed will also depend upon whether the metalliferous particles are composed of elemental metal or metal lower oxide particles. In any event, the amount of terpene ether employed will generally be an amount sufficient to provide at least a partial coating of terpene ether on the surfaces of the particles of the metalliferous powder and is preferably an amount sufficient to provide a partial to continuous coating, most preferably a continuous coating, of the terpene ether on the surfaces of the metalliferous particles. A continuous coating is preferred to stabilize the metalliferous powders against oxidation under the more severe oxidative conditions. Usually, the amount of terpene ether will be in the range of from about 0.025% to about 0.3% by weight, based on the weight of the composition. If less than about 0.025% by weight is employed, the particles will be insufficiently coated and may not prevent oxidation on the surfaces of the particles. If more than about 0.3% by weight of terpene ether is employed, the particles will be continuously but excessively coated and the excess terpene ether may sometimes interfere with the end use of the metalliferous powder.

The reasons for the surprising effectiveness of small quantities of the terpene ether in preventing the surface oxidation of the relatively large surfaces of the metalliferous powders is not known with certainty but it is believed to be due to some "anti-oxidant property" of the terpene ether which is not presently understood.

A wide variety of metalliferous powder particles, including powdered metal particles, powdered metal alloy particles and powdered metal lower oxide particles, may be coated with terpene ether to provide the novel compositions of this invention. Powdered elemental metals include those oxidizable metals between magnesium and gold in the Electromotive Series as set forth on page 1733 of the Handbook of Chemistry and Physics, 40th Edition, published by the Chemical Rubber Company, and their alloys. Examples of powdered metals and metal alloys are those conventionally used in the powdered metallurgy art and include, for example, powdered iron, certain powdered steels, copper, nickel, aluminum, cobalt, magnesium, bismuth and the like. Examples of powdered metal lower oxides are those metal oxides capable of being oxidized to a higher valence state, for example ferrous oxide, cuprous oxide, cobaltous oxide and the like.

The metalliferous powders employed in the compositions of this invention are composed of small particles having a particle size in the range of that conventionally used in the powder metallurgy art, including the metal slip casting art, to particle size in the range conventionally used in the coating pigment art. Generally the particle size of the particles of the metalliferous powder is such that the average particles will be from about 100 mesh (U.S. standard screen, e.g., about 150 microns in one dimension) to 325 mesh (U.S. standard screen, e.g., about 40 microns in one dimension). Where the metalliferous particles comprise an elemental metal the size of the particles will be such that all or substantially all of the particles will pass through a No. 100 mesh U.S. standard screen and about 0.5% to about 50% of the particles will be retained on a No. 325 mesh U.S. standard screen. Where the metalliferous powder is a metal lower oxide the size of the particles will be such that all or substantially all of the particles will pass through a No. 200 mesh U.S. standard screen and from about 50% to about 99.5% of the particles will pass through a No. 325 mesh screen.

When the composition is composed of elemental metal particles having a partial to continuous coating of a terpene ether on the surface of the particles, the composition will contain from about 0.025% to about 0.1%, by weight, of terpene ether. Where the composition is composed of metal lower oxide particles, the composition will contain from about 0.1% to about 0.3%, by weight, of terpene ether. If the metalliferous powder is composed of elemental metal particles and contains less than about 0.025%, by weight, of terpene ether (in the form of a partial to continuous coating on surfaces thereof), the particles will usually have an insufficient coating to entirely prevent the formation of oxide films on the particle surfaces of elemental metal powders. On the other hand, if more than about 0.1%, by weight, of terpene ether is employed in such compositions, the compositions when used in powder metallurgy operations will not provide castings having the desired green strength, probably due to the excess of terpene ether on the surfaces of the particles.

Where the composition is composed of particles of a metal lower oxide and less than about 0.1%, by weight, of terpene ether is employed, the particles of such metal lower oxide are not always adequately protected against further oxidation (e.g., oxidation to a higher valence state) and often will tend to coalesce, agglomerate or form lumps within a relatively short period of time when stored. If more than about 0.3%, by weight, of terpene ether is employed in such metal lower oxide compositions, no advantages inure to the composition and the effectiveness of the metal lower oxides for the end use intended (e.g., as pigments in paints) may be diminished to some extent.

Since elemental metal powders such as copper, iron and steel are more widely used than other metal powders in powdered metallurgy, one advantageous embodiment of this invention comprises elemental metal particles, or alloy powders (e.g., copper, iron or steel) having a partial to continuous coating on the surfaces of the particles of one or more of the terpene ethers hereinbefore described. The amount of terpene ether, in the form of a coating on the particles, is in the range of from about 0.025% to about 0.1%, by weight, based on the weight of the composition. The above compositions can be stored for long periods of time in atmospheric air after which they can be compressed into forms or compacts which have a high green strength prior to sintering and which, after sintering, provide strong formed metal articles which do not tend to fracture when subjected to ordinary mechanical force. Also, the coated elemental metal powders retain their original color and can be used in liquid metal coating formulations without danger of altering the color of the coating made from coated metal composition.

Powdered cuprous oxide is one of the most widely used of the metal lower oxides, being employed as a pigment in paint formulations, particularly antifouling paint formulation, and as the active agent in fungicidal formulations. Therefore one embodiment of a metal lower oxide composition comprises cuprous oxide particles having a partial to continuous coating on the surfaces thereof of one or more of the terpene ethers hereinbefore described. The amount of terpene ether in such compositions, in the form of a coating on the surface of the particles, will usually be in the range from about 0.1% to about 0.3%, by weight, based on the weight of the composition. Such cuprous oxide powder compositions can be stored for long periods of time without further oxidation and subsequent coalescence or lump formation and remain readily dispersible in liquid formulations, such as paints or wet sprays.

It has presently been found possible to stabilize oxidizable metalliferous powders against oxidation and to provide the novel compositions of this invention by a process which comprises intimately contacting the oxidizable metalliferous powders, either elemental metal powders or metal lower oxide powders, with a terpene ether falling within the scope of Formula I, hereinbefore described, in an amount sufficient to significantly improve the oxidation resistance of the metalliferous particles and to substantially prevent oxidation of the metalliferous particles in atmospheric air.

By intimately contacting the powders with terpene ethers within the ranges hereinbefore described there is formed a partial to continuous coating of the terpene ether on the surfaces of the particles. The coating formed is an extremely thin coating. As noted hereinbefore, the amount of terpene ether in the powder compositions is quite small and the surface area of the powder particles of the composition is relatively large. Compositions comprising metalliferous particles and terpene ethers wherein the terpene ether is present within the lower level of the ranges previously described may be comprised of some particles which are but partially coated with the ether. Surprisingly, however, oxidizable metalliferous compositions comprising particles, a portion of which are only partially coated with a terpene ether, are substantially stabilized against oxidation in atmospheric air.

Contact of the metalliferous powder particles with the terpene ether can be accomplished by a variety of methods such as, for example, slurrying the metalliferous particles in a liquid comprising a sufficient quantity of a terpene ether dissolved in a volatile solvent such as, for example, ethyl acetate or acetone, and separating the metalliferous powder from the bulk of the liquid phase by well known methods such as filtration, centrifugation, decantation, evaporation and the like. Contact can also be achieved by atomizing the terpene ether as such or when dissolved in a volatile solvent, over a fixed or fluidized bed of the metalliferous particles.

It has been found especially desirable to contact the metalliferous powder with the terpene ether in pure or undiluted form by intimately admixing the powder with a sufficient quantity of terpene ether to provide the aforementioned partial to continuous coating on the surfaces of the powder particles.

By so proceeding expensive solvents and the step of dissolving the ether in the solvents are eliminated, thus achieving a more economical process. The admixing can be carried out by any suitable means; for example, by balling milling, tumbling or in a standard mechanical mixer.

A particularly advantageous embodiment comprises intimately admixing the terpene ether with a fraction of a predetermined quantity of metalliferous powder to form a pre-mix comprising a substantially uniform mixture of a portion of the powder and the terpene ether. The premix can then be intimately admixed with the remainder of the predetermined quantity of metalliferous powder until a partial to continuous coating is formed on the surfaces thereof.

The metalliferous powder is preferably contacted and coated with the terpene ether by first intimately admixing from about 10% to about 20%, by weight, of a predetermined quantity of metalliferous particles with from about 0.025% to about 0.3%, by weight, of terpene ether, based on the weight of the predetermined quantity of metalliferous particles. There is thus formed a premix composition comprising a uniform mixture of the terpene ether and a portion of the metalliferous powder particles. Such premix composition is thereafter intimately admixed with the remainder of the metalliferous particles until a partial to continuous coating of the terpene ether is formed on the surfaces of the predetermined quantity of metalliferous particles. By so proceeding oxidizable particles of iron, copper, steel, etc., and cuprous, cobaltous, ferrous, etc. oxides are stabilized against oxidation, do not discolor, and do not coalesce or form lumps.

The following specific examples are intended to illustrate the invention but not to limit the scope thereof, parts and percentages being by weight unless otherwise specified.

Example 1

To a reaction vessel there was added 500 pounds of alpha pinene, 400 pounds of ethylene glycol, and 30 pounds of boron trifluoride etherate to form a reaction mixture. This mixture was heated at a temperature which fluctuated between 50° C. and 55° C. for four hours, after which the contents of the reaction vessel were cooled and allowed to settle into two layers. The lower layer of liquid, which consisted of unreacted ethylene glycol was removed from the container and the top layer washed with a solution of sodium carbonate to remove the boron trifluoride etherate. Five hundred seventy-five pounds of a terpene ether product having a specific gravity of 0.982 at 15.5° C., a refractory index of 1480 at 20° C. and a boiling point of 273° C., plus or minus 1, was obtained. Upon analysis the product was found to be a mixture of isomers in which T had the postulated configurations shown in Formulae II, III and IV.

The above product was used to coat copper powder particles, iron powder particles and cuprous oxide powder particles as follows:

Example 2

To 100 pounds of copper powder having a particle size such that all of the particles pass through a No. 100 mesh U.S. standard screen and 50% of the particles were retained on a No. 325 mesh U.S. standard screen, there was added 0.05 pound of the terpene ether prepared in Example I, and the materials were mixed thoroughly using the following procedure: A 10-lb. pre-mix was prepared by mixing 10 pounds of the copper powder particles with the 0.05 pound of terpene ether in a Reed mixer for two hours. Thereafter the 10-lb. pre-mix and 90 pounds of copper powder were added to a twin shell blender and mixed for five minutes. A sample of the powder was then placed in a storage area in open case for 30 days with precautions taken to prevent contamination from dust but to permit air circulation. The copper powder particles remained a bright red during the 30-day storage period. By way of contrast, uncoated copper particles stored under substantially identical conditions which were initially very bright in color turned dark brown in color within 12 days under these storage conditions.

Samples of the above powder were subjected to a green strength test which consisted of pressing 15 grams of powder in a die to 15,000 lbs. pressure and measuring the change in thickness, which is a standard test showing change in compressibility due to oxidation. As initially prepared, the terpene ether coated copper particles were compressed to a thickness of .2528 inch and had a modulus of rupture of 1130 pounds per square inch. Samples of copper powder compressed after 12 days of storage were compressed to a thickness of .2555 inch and had a modulus of rupture of 1160 lbs. per square inch, indicating that substantially no oxidation had occurred. Untreated copper powders so stored were initially compressed to a thickness of .2538 inch and untreated powder which had been stored for 12 days compressed to a thickness of .2595 inch. The modulus of rupture of the unstored untreated copper powder was 1460 pounds per square inch but untreated powders compressed after 12 days storage had a modulus of rupture of 960 lbs. per square inch, a significant increase in thickness and decrease in modulus of rupture of the compact, indicating that substantial oxidation had occurred.

Example 3

To 100 pounds of cuprous oxide powder there was added .025 pound of the terpene ether prepared in Example 1. The terpene ether and cuprous oxide powder were mixed as follows:

The terpene ether was added to 15 pounds of the cuprous oxide in a Reed mixer and an intimate admixture was obtained after four hours of mixing. This mixture was then mixed with 85 pounds of cuprous oxide in a twin shell blender for 8 hours. The cuprous oxide powder had a bright red color as initially prepared and was stored in open containers for six weeks. At the end of this time the color of the cuprous oxide remained bright red in contrast to untreated copper powder which turned a dark brown. The coated cuprous oxide powder remained finely divided whereas the untreated copper powder had coalesced and formed a large number of lumps. Prior to treatment and air exposure the cuprous oxide powder analyzed at 97.4% $Cu_2O$ and after 45 days of storage the samples had the same $Cu_2O$ content. The untreated cuprous oxide powder after this period contained 96.4% $Cu_2O$, indicating that 1% of the powder (e.g., the amount on the surface) had oxidized to a higher valence state.

The coated cuprous oxide powder, when added to an antifouling paint formulation as a part of the pigment, dispersed readily and did not agglomerate or form lumps in the formulation. Conversely, uncoated cuprous oxide powder which had been stored and which was lumpy could not be entirely dispersed and remained in lumpy form in the antifouling paint formulation.

Example 4

To 100 pounds of iron powder having a particle size such that all or substantially all of the particles passed through a No. 100 mesh U.S. standard screen and all or substantially all of the particles were retained on a 250 mesh U.S. standard screen there was added 0.035 lb. of the terpene ether prepared in Example 1. The mixing procedure was that described in Example 2. Samples of the terpene ether coated iron particles were exposed to air in open containers alongside uncoated iron particles. The coated iron particles remained lustrous and had a metallic color whereas the untreated iron powder darkened and had a dull appearance, indicating a substantial formation of oxide film on the surface of the particles.

Example 5

The procedure of Example 1 was repeated except that propylene glycol was substituted for the ethylene glycol in the reaction described in that example. Upon completion of the reaction 600 pounds of a propylene glycol adduct of alpha pinene was obtained. When copper, cuprous oxide and iron powders were coated and tested with this product using the procedures respectively described in Examples 2, 3 and 4, substantially the same results were obtained as were obtained with the materials described in those examples. The copper powder remained bright and shiny and its compressibility and green strength were not altered. The coated cuprous oxide powder did not coalesce or form lumps and the coated iron powder retained its lustrous metallic appearance.

Example 6

The procedure of Example 1 was repeated except that 2 mols of ethylene oxide was reacted with 1 mol of ethylene glycol to form a product (which was reacted with an equimolar quantity of alpha pinene) in place of the substantially single molar quantity of ethylene glycol employed in that example. An ethylene oxide adduct was obtained in which there were three ethylene oxide groups per mol of terpene radical in the compound. This product was evaluated as described in Examples 2, 3 and 4 and substantially the same results were obtained. In all instances oxidation of the copper, cuprous oxide and iron powder was prevented.

Example 7

The procedure of Example 1 was repeated except that alpha terpineol was substituted for the alpha pinene employed in that example. The reaction product obtained was a soft, semi-solid wax-like product. When used to coat copper, cuprous oxide and iron powder the coated products obtained were stable to air oxidation when evaluated under conditions substantially identical to the conditions described in Examples 2 through 4.

What is claimed is:

1. A free flowing metalliferous powder composition resistant to oxidation, comprising oxidizable metalliferous particles having a partial to continuous coating on the surface of said particles of a terpene ether of the formula:

$$T-O-(R-O)_nH$$

where T is a terpene hydrocarbon radical; R is a lower alkylene group, and $n$ is an integer of from 1 to 5; the amount of said terpene ether in said composition being from about 0.025 percent to about 0.3 weight percent, based on the weight of the composition.

2. A composition as in claim 1 where T is an unsaturated monocyclic terpene hydrocarbon radical and $n$ is an integer of 1.

3. A composition as in claim 2 where R is a lower alkylene group containing from 2 to 3 carbon atoms.

4. A composition as in claim 3 where R is an ethylene group.

5. A composition as in claim 1 wherein the metalliferous particles are particles of an elemental metal.

6. A composition as in claim 5 wherein the elemental metal is copper.

7. A composition of claim 5 wherein the elemental metal is iron.

8. A composition as in claim 1 wherein the metalliferous particles are particles of a metal oxide capable of oxidation to a higher valence state.

9. A composition as in claim 8 wherein the metal oxide is cuprous oxide.

10. A composition as in claim 8 wherein the metal oxide is ferrous oxide.

11. A free flowing metalliferous powder composition resistant to oxidation, comprising oxidizable metalliferous particles having a partial to continuous coating on the surface of said particles of an isomeric terpene ether selected from the group consisting of:

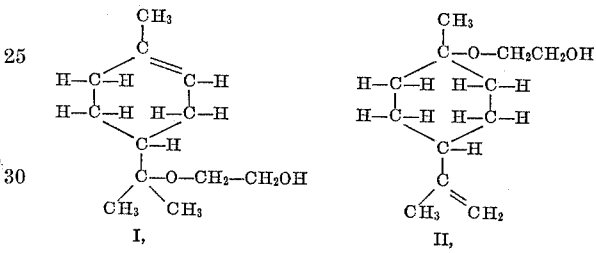

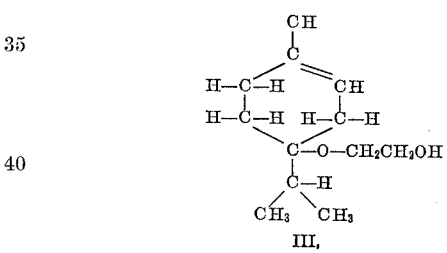

and mixtures thereof; the amount of said terpene ether in said composition being from about 0.025 percent to about 0.3 weight percent, based on the weight of the composition.

12. A cmoposition as in claim 11 wherein the finely divided metalliferous particles are elemental copper particles.

13. A composition as in claim 11 wherein the finely divided metalliferous particles are particles of cuprous oxide.

References Cited

UNITED STATES PATENTS

| | | | |
|---|---|---|---|
| 1,756,772 | 4/1930 | Weisberg et al. | 117—100 |
| 2,151,769 | 3/1939 | Humphrey | 260—611 |
| 2,514,868 | 7/1950 | Hubbell | 260—27 X |

WILLIAM D. MARTIN, *Primary Examiner.*